United States Patent
Kobayashi

(10) Patent No.: US 10,205,883 B2
(45) Date of Patent: Feb. 12, 2019

(54) DISPLAY CONTROL METHOD, TERMINAL DEVICE, AND STORAGE MEDIUM

(71) Applicant: FUJITSU LIMITED, Kawasaki-shi, Kanagawa (JP)

(72) Inventor: Shigeyuki Kobayashi, Hino (JP)

(73) Assignee: FUJITSU CONNECTED TECHNOLOGIES LIMITED, Kawasaki (JP)

( * ) Notice: Subject to any disclaimer, the term of this patent is extended or adjusted under 35 U.S.C. 154(b) by 368 days.

(21) Appl. No.: 15/248,516

(22) Filed: Aug. 26, 2016

(65) Prior Publication Data
US 2017/0070680 A1    Mar. 9, 2017

(30) Foreign Application Priority Data
Sep. 9, 2015   (JP) .................. 2015-177597

(51) Int. Cl.
  *H04N 5/232* (2006.01)
  *G06K 9/00* (2006.01)
  *H04N 5/33* (2006.01)
  *G06F 21/32* (2013.01)

(52) U.S. Cl.
  CPC ......... *H04N 5/23293* (2013.01); *G06F 21/32* (2013.01); *G06K 9/0061* (2013.01); *G06K 9/00604* (2013.01); *G06K 9/00617* (2013.01); *H04N 5/332* (2013.01)

(58) Field of Classification Search
  None
  See application file for complete search history.

(56) References Cited

U.S. PATENT DOCUMENTS

| 9,564,177 B1* | 2/2017 | Gray ................ G11B 27/3081 |
| 2005/0200806 A1 | 9/2005 | Knaan et al. |
| 2013/0120618 A1* | 5/2013 | Wang ................ H04N 5/23296 348/240.99 |

FOREIGN PATENT DOCUMENTS

| JP | 2005-253778 A | 9/2005 |
| JP | 2006-48266 A | 2/2006 |
| JP | 2006-181012 A | 7/2006 |
| JP | 2008-197713 A | 8/2008 |

* cited by examiner

*Primary Examiner* — Chan Park
*Assistant Examiner* — Elisa Rice
(74) *Attorney, Agent, or Firm* — Westerman, Hattori, Daniels & Adrian, LLP

(57) ABSTRACT

A display control method executed by a processor included in a terminal device that includes a display and a camera disposed at a display surface side of the display, the display control method includes acquiring a first image taken by the camera, the first image including a second image of a face; calculating a proportion of a region of the second image to a region of the first image; determining whether the proportion is equal to or higher than a threshold; displaying the first image on the display when it is determined that the proportion is equal to or higher than the threshold; and restraining the first image from being displayed on the display when it is determined that the proportion is not equal to or higher than the threshold.

9 Claims, 17 Drawing Sheets

FIG. 10A
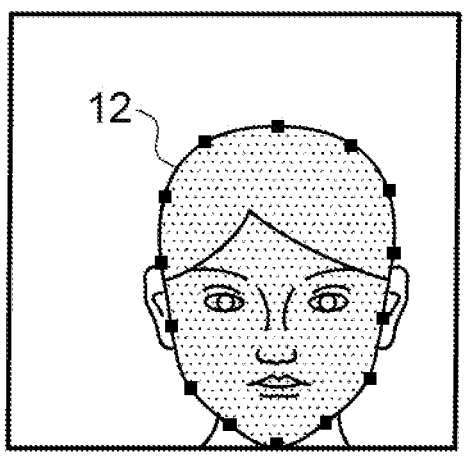
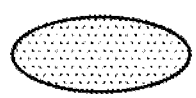 FACE CONTOUR LINE DETECTED IN IMAGE
REGION JUDGED TO BE WITHIN FACE CONTOUR LINE FIG. 10B
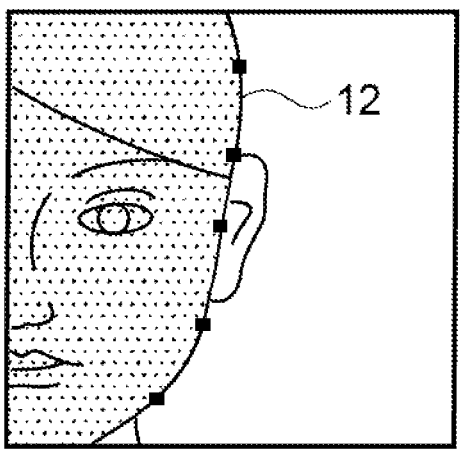
 FACE CONTOUR LINE DETECTED IN IMAGE
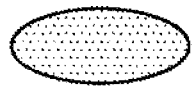 REGION JUDGED TO BE WITHIN FACE CONTOUR LINE

———■——— FACE CONTOUR LINE DETECTED IN IMAGE

REGION JUDGED TO BE WITHIN FACE CONTOUR LINE

DISPLAY CONTROL METHOD, TERMINAL DEVICE, AND STORAGE MEDIUM

CROSS-REFERENCE TO RELATED APPLICATION

This application is based upon and claims the benefit of priority of the prior Japanese Patent Application No. 2015-177597, filed on Sep. 9, 2015, the entire contents of which are incorporated herein by reference.

FIELD

The embodiments discussed herein are related to a display control method, a terminal device, and a storage medium.

BACKGROUND

With the increase in awareness of management of information such as personal information in recent years, the electronic devices having a security function have started to be widely used In the security function, a person wishing to access information is subjected to an authentication check to determine whether the person has been given permission to access the information.

Among proposed methods for authenticating a person such as fingerprint authentication, vein authentication, and face authentication, iris authentication is regarded as a promising method due to its high acceptance rate and easy user operation for authentication. In the iris authentication, an image of iris regions existing around the pupils of a person is taken by a camera, and authentication is thereafter performed. For example, Japanese Laid-open Patent Publication No. 2006-181012, Japanese Laid-open Patent Publication No. 2006-48266, Japanese Laid-open Patent Publication No. 2008-197713, Japanese Laid-open Patent Publication No. 2005-253778, and other documents disclose related arts.

However, if a mobile terminal such as a smartphone is provided with the iris authentication function, there is a necessity to take an image of the face of a user of the mobile terminal before using the mobile terminal, for example, by a camera incorporated in the mobile terminal to thereby acquire an image of the iris regions of the user.

If the iris authentication is performed with a person other than the user being present near the mobile terminal, for example, in a store or a train, it is conceivable in some cases that the action of taking a photograph of the iris regions of the user causes the person near the user to misunderstand that the user is taking a sneak photograph, that is, taking a photograph of the person other than the user is taken without permission.

A misunderstanding where such an action is misunderstood as sneak photography may occur not only when authentication such as the iris authentication is performed but also when the user takes a photograph of the user himself/herself with the mobile terminal held with his/her hand, that is, when a so-called "selfie" is performed. When the user takes a self-portrait, it is desirable to reduce the likelihood of such an action being misunderstood as sneak photography.

SUMMARY

According to an aspect of the invention, a display control method executed by a processor included in a terminal device that includes a display and a camera disposed at a display surface side of the display, the display control method includes acquiring a first image taken by the camera, the first image including a second image of a face; calculating a proportion of a region of the second image to a region of the first image; determining whether the proportion is equal to or higher than a threshold; displaying the first image on the display when it is determined that the proportion is equal to or higher than the threshold; and restraining the first image from being displayed on the display when it is determined that the proportion is not equal to or higher than the threshold.

The object and advantages of the invention will be realized and attained by means of the elements and combinations particularly pointed out in the claims;

It is to be understood that both the foregoing general description and the following detailed description are exemplary and explanatory and are not restrictive of the invention, as claimed

BRIEF DESCRIPTION OF DRAWINGS

FIG. 10A is a diagram illustrating an example infrared image in which a face occupancy proportion is lower than a threshold;

FIG. 10B is a diagram illustrating an example infrared image in which the face occupancy proportion is lower than the threshold;

DESCRIPTION OF EMBODIMENTS

Figure 1:
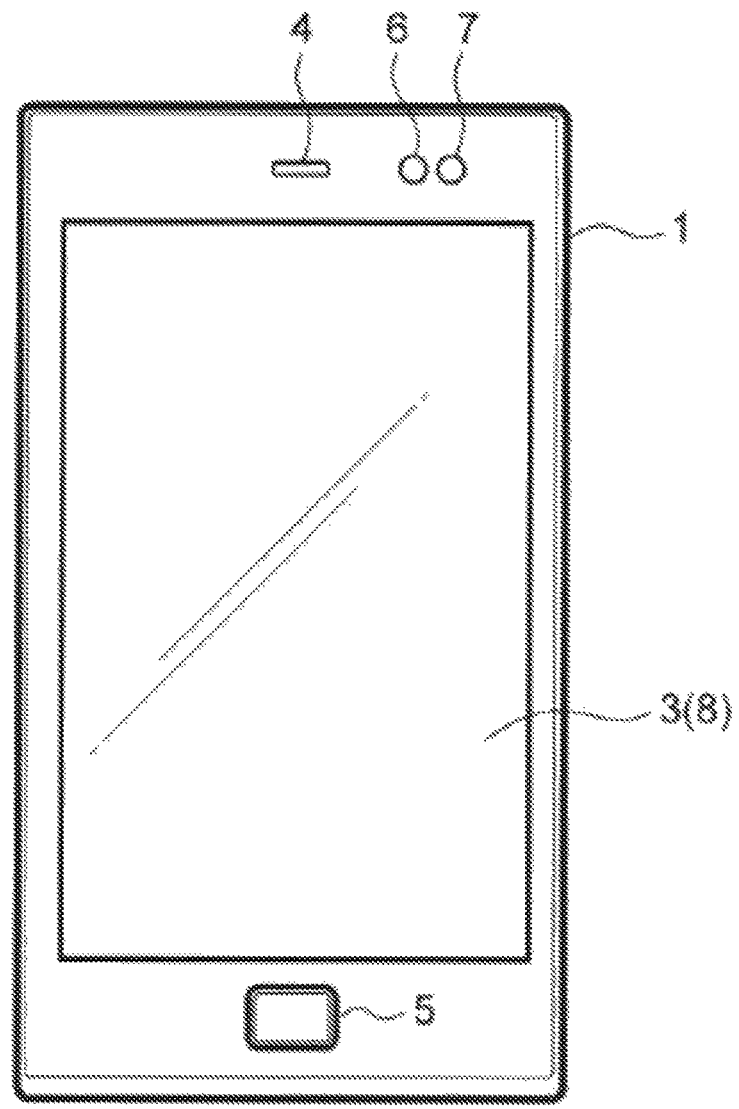
FIG. 1 is a diagram illustrating an example appearance of a smartphone.

Hereinafter, examples of embodiments of disclosed technology will be described in detail with reference to the drawings. In the following description, components or processes having the same function are denoted by the same reference numeral throughout the drawings, and repeated explanation may be appropriately omitted.

Although embodiments in which the disclosed technology is applied to a smartphone are hereinafter described, the disclosed technology is applicable to other mobile electronic devices such as a notebook computer, a tablet terminal, and a wearable terminal.

First Embodiment

A smartphone 1 illustrated in FIG. 1 includes, for example, a display device 3, a telephone conversation speaker 4, an unlock button 5, an infrared light emitting diode (LED) 6, an infrared camera 7, and a touch panel 8.

The display device 3 is a device that displays data stored, for example, in the smartphone 1, data downloaded from a server coupled to a communication network such as the Internet, or other data The display device 3 is a display device such as a liquid crystal display or an organic electroluminescence (EL) display. The touch panel 8 is attached to the display surface of the display device 3. The touch panel 8 receives manipulation performed by a user of the smartphone 1.

The telephone conversation speaker 4 is a voice output device that outputs the voice of the other person on the phone in telephone conversation. Although not illustrated in FIG. 1, the smartphone 1 also includes a microphone for taking voice into the smartphone 1.

The smartphone 1 has a locking function of hindering any person other than, for example, a person authorized to use the smartphone 1 (hereinafter, referred to as an authorized user) from manipulating the smartphone 1 and from reading personal information and other information stored in the smartphone 1.

The authorized user locks the smartphone 1 by pressing a locking start button (not illustrated), for example, displayed on the display device 3. This manipulation stops the smartphone 1 from receiving manipulation performed by a person other than the authorized user. A method for locking the smartphone 1 is not limited thereto. For example, manipulation intervals may be measured using the smartphone 1. The smartphone 1 may be configured to lock if a period of time in which the smartphone 1 is not manipulated reaches a predetermined time.

The unlock button 5 is a button to be pressed to unlock the smartphone 1. When someone presses the unlock button 5, the smartphone 1 performs iris authentication. If the iris authentication succeeds, the smartphone 1 unlocks the smartphone 1. The location of the unlock button 5 on the smartphone 1 is an example, and the unlock button 5 does not necessarily have to be located on the display surface side of the display device 3. For example, the unlock button 5 may be located on a side surface of the case of the smartphone 1 or on a surface of the display device 3 opposite to the display surface (hereinafter, referred to as a back surface).

The infrared LED 6 and the infrared camera 7 are used for an iris authentication process (described later). The infrared LED 6 is a light source that emits an infrared ray. The infrared camera 7 takes an infrared image of the user in such a manner that the infrared ray reflected on the user that is subjected to the iris authentication is divided and detected by a plurality of infrared ray detection elements for a plurality of pixels. If the iris pattern of the iris regions of the user included in the infrared image coincides with the iris pattern of an iris image of the authorized user registered in advance, for example, in the smartphone 1, the smartphone 1 unlocks.

Visible light is more likely to cause specular reflection on corneas covering the iris regions than an infrared ray and thus in some cases leads to an unclear iris region image. Accordingly, for the iris authentication, an infrared ray is generally used as a light source for irradiating the iris regions. The infrared ray herein refers to an electromagnetic wave having a wavelength in the range from, for example, about 830 nm to about 1000 µm.

The infrared camera 7 has changeable photographing magnification (hereinafter, referred to as an angle of view) used for taking an infrared image. Since a change in the photographing magnification leads to a change in the angle of view, the photographing magnification will hereinafter be described using the angle of view. The change in the angle of view is implemented by at least one of an optical zoom system or a digital zoom system. However, this is an example, and the infrared camera 7 with a fixed angle of view may be used.

Figure 2:
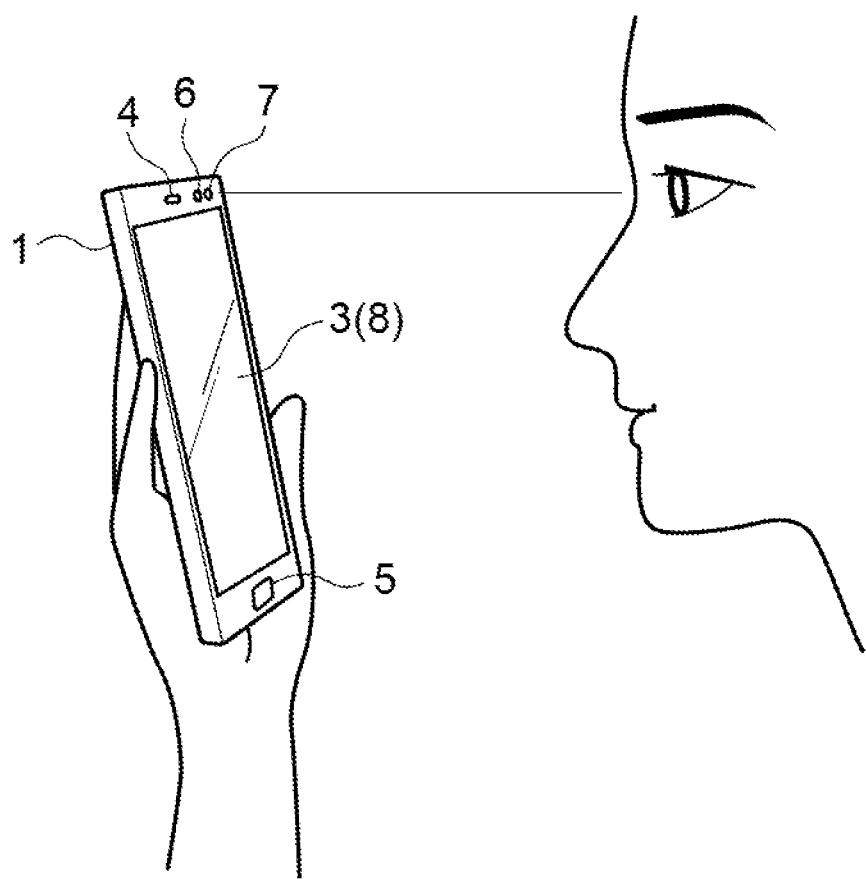
FIG. 2 is a diagram illustrating an example of how iris authentication is performed.

To perform the iris authentication as illustrated in FIG. 2, the user refers to an infrared image displayed on the display device 3 and moves the smartphone 1 and the user's face relative to each other. The user adjusts the location and the size of the image of the user's eyes displayed on the display device 3.

In this manner, the user takes a photograph of the iris regions of the user himself/herself by using the infrared camera 7 while looking at the user himself/herself displayed on the display device 3. Accordingly, the infrared LED 6 and the infrared camera 7 are desirably arranged on the same plane as the display surface of, for example, the display device 3.

A camera provided on the display surface side of the display device 3 may be referred to as an "in-camera", while a camera provided on the back surface of the smartphone 1 may be referred to as an "out-camera". In many cases, the in-camera is mainly used for taking an image including the user such as selfie, and the out-camera is mainly used for taking an image excluding the user such as a landscape.

Figure 3:
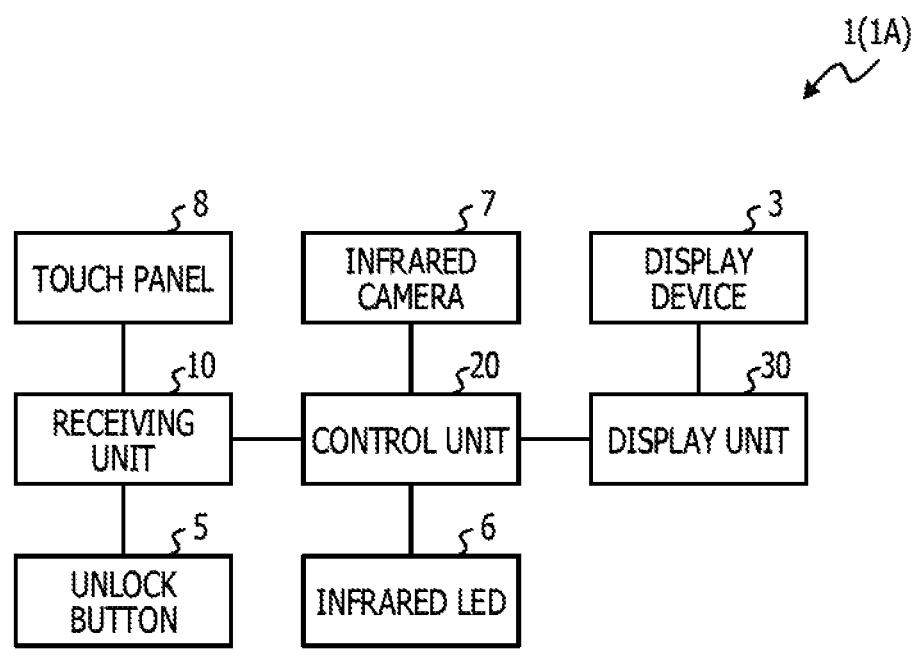
FIG. 3 is a diagram illustrating an example configuration of a smartphone according to a first embodiment and a second embodiment.

As illustrated in FIG. 3, the smartphone 1 includes the display device 3, the unlock button 5, the infrared LED 6, the infrared camera 7, the touch panel 8, a receiving unit 10, a control unit 20, and a display unit 30.

The receiving unit 10 is coupled to buttons such as the unlock button 5, the touch panel 8, and the control unit 20. The receiving unit 10 receives pressing manipulations of buttons such as the unlock button 5 and various manipulations of the touch panel 8. The receiving unit 10 notifies the control unit 20 of the content of the manipulation.

The control unit 20 is coupled to the receiving unit 10, the display unit 30, the infrared LED 6, and the infrared camera 7. Upon receiving, for example, pressing of the unlock button 5 from the receiving unit 10, the control unit 20 causes the infrared LED 6 to emit an infrared ray, causes the infrared camera 7 to take an image of a subject, and executes the iris authentication process on the iris regions of a person included in the infrared image thus taken. In this case, the control unit 20 determines the direction in which the person is looking and the sight distance. If the proportion of the face image of the person to the entire infrared image (hereinafter, referred to as a face occupancy proportion) becomes equal to or higher than a threshold, the control unit 20 controls the display unit 30 to display the taken infrared image on the display device 3.

The sight distance is a distance from the infrared camera 7 to the eyes of a person that is a subject. The face image is an image in a region including the face of the person in the taken image. The face occupancy proportion may be calculated based on, for example, a relationship between the sight distance and the angle of view of the infrared camera 7.

The display unit 30 is coupled to the display device 3 and the control unit 20 and displays an infrared image designated by the control unit 20 on the display device 3.

Figure 4:
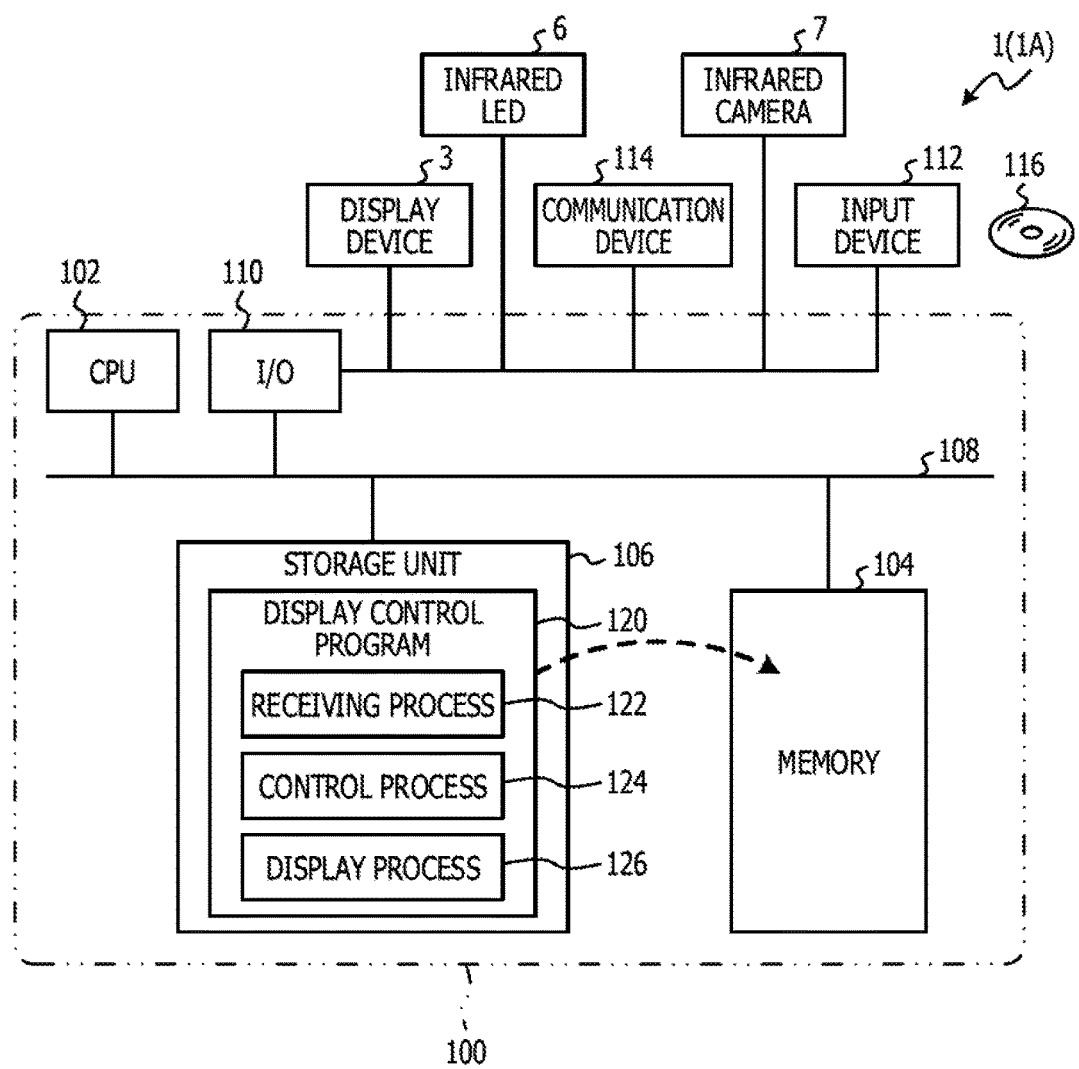
FIG. 4 is a diagram illustrating an example configuration employed in a case where the smartphone according to the first and second embodiments is implemented by a computer.

A computer 100 illustrated in FIG. 4 includes a central processing unit (CPU) 102, a memory 104, and a nonvolatile storage unit 106. The CPU 102, the memory 104, and the nonvolatile storage unit 106 are coupled to each other through a bus 108. The computer 100 includes an input/output (I/O) 110 through which the display device 3, the infrared LED 6, the infrared camera 7, an input device 112, and a communication device 114 are coupled to the computer 100. The I/O 110 is coupled to the bus 108.

The input device 112 includes an input device such as the touch panel 8 that outputs, to the computer 100, the location of the display device 3 selected by a user of the computer 100. The input device 112 includes a reading device that reads data to be recorded in a recording medium 116 such as a memory card.

The communication device 114 includes communication protocols for wirelessly transmitting and receiving data to and from the server coupled to the communication network such as the Internet. The communication device 114 transmits and receives data to and from, for example, a server designated by the computer 100. The mode of connection to the communication network performed in the communication device 114 is not limited to the wireless connection. The mode of connection may be, for example, wired connection.

In the example in FIG. 4, the display device 3, the infrared LED 6, the infrared camera 7, the input device 112, and the communication device 114 are illustrated as devices independent from the computer 100. However, these devices may be incorporated in the computer 100. Further, the communication device 114 is coupled to the computer 100 in the example in FIG. 4. However, if data does not have to be transmitted to and received from another electronic device through the communication network, the communication device 114 does not have to be coupled to the computer 100.

The storage unit 106 may be implemented by a flash memory, a hard disk drive (HDD), or another component.

The storage unit 106 stores therein the display control program 120 for causing the computer 100 to function as the smartphone 1 illustrated in FIG. 3. The display control program 120 stored in the storage unit 106 includes a receiving process 122, a control process 124, and a display process 126.

The CPU 102 reads the display control program 120 from the storage unit 106, loads the display control program 120 into the memory 104, executes the processes included in the display control program 120, and thereby causes the computer 100 to serve as the smartphone 1 illustrated in FIG. 3.

Specifically, the CPU 102 executes the receiving process 122, and the computer 100 thereby serves as the receiving unit 10 illustrated in FIG. 3. The CPU 102 executes the control process 124, and the computer 100 thereby serves as the control unit 20 illustrated in FIG. 3. The CPU 102 executes the display process 126, and the computer 100 thereby serves as the display unit 30 illustrated in FIG. 3.

The computer 100 may also be implemented by, for example, a semiconductor integrated circuit, more specifically, an application specific integrated circuit (ASIC) or another circuit.

Subsequently, operations of the smartphone 1 according to a first embodiment will be described. When being notified of receiving of pressing of the unlock button 5 from the receiving unit 10, the control unit 20 executes the iris authentication process for determining whether the feature of iris regions in an image taken by the infrared camera 7 is similar to the feature of the iris regions of the authorized user of the smartphone 1.

Figure 5:
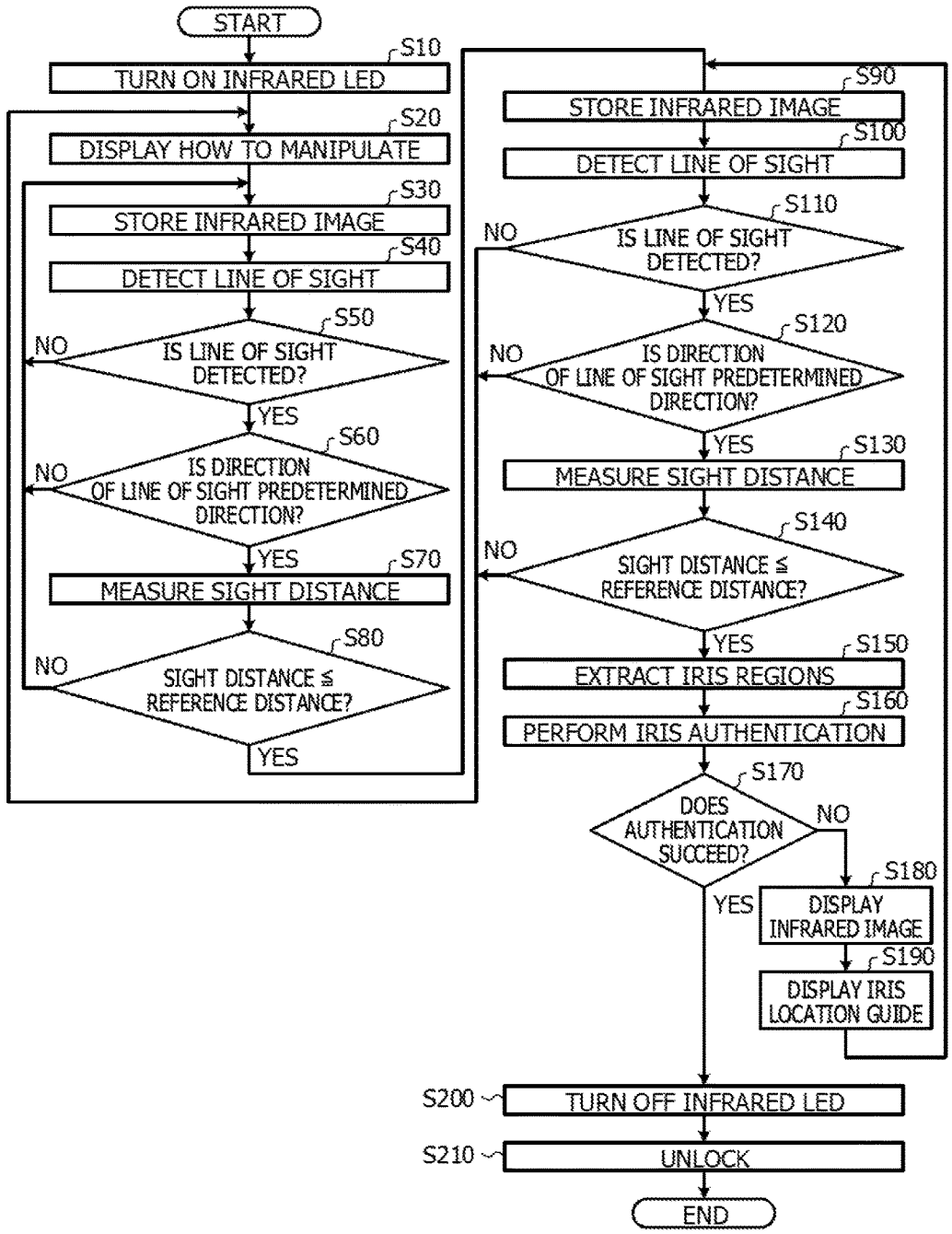
FIG. 5 is a flowchart illustrating an example of an iris authentication process according to the first embodiment.

First in S10 in FIG. 5, the control unit 20 turns on the infrared LED 6 by turning on a switch (not illustrated) that supplies power to the infrared LED 6 and starts emission of the infrared ray.

In S20, the control unit 20 controls the display unit 30 and thereby displays, on the display device 3, a screen (hereinafter, referred to as an iris authentication guide screen) by which the start of the iris authentication process is notified to the user who is manipulating the smartphone 1.

Figure 6:
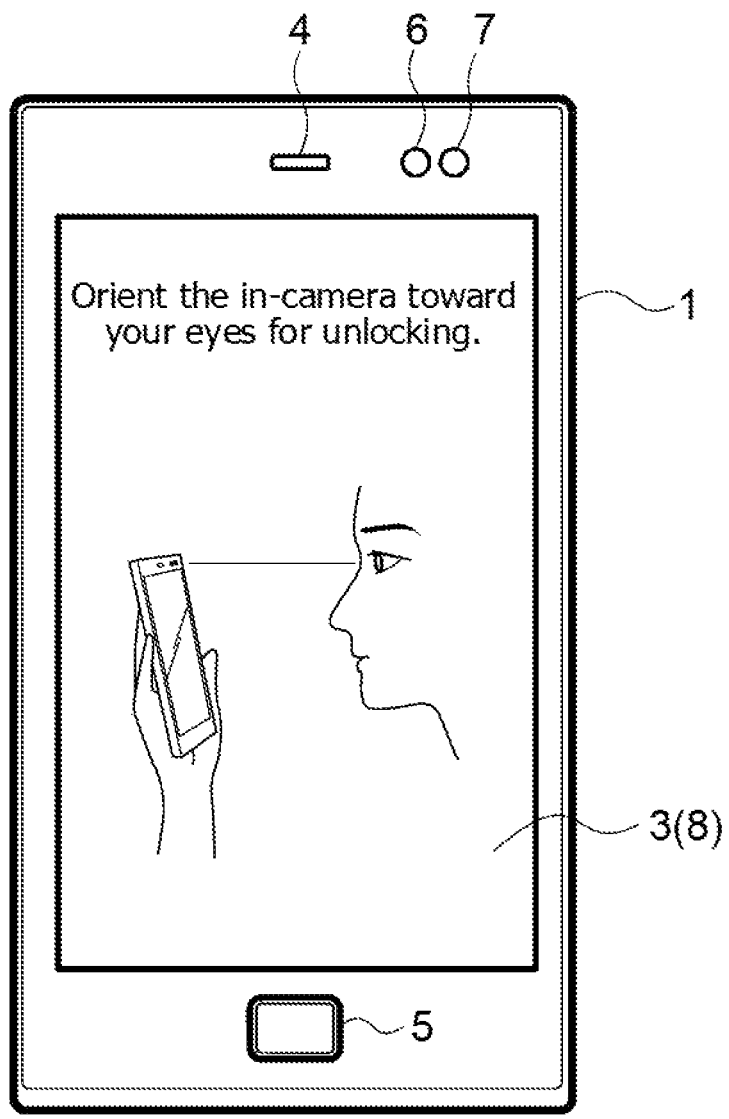
FIG. 6 is a diagram illustrating an example iris authentication guide screen.

As illustrated in FIG. 6, in S20, a message instructing the user to orient the infrared camera 7 toward the user's eyes such as "Orient the in-camera toward your eyes for unlocking." is displayed on the display device 3. In this case, the control unit 20 may display, on the display device 3 together with the message, an image depicting a state where the infrared camera 7 is oriented toward the eyes of the user of the smartphone 1. Displaying the image on the display device 3 enables the user of the smartphone 1 to be notified of manipulation for the iris authentication in a more user-friendly manner than using only the message to notify the user of manipulation for the iris authentication. A sound may be used to notify the user of the start of the iris authentication process.

The control unit 20 repeats displaying the iris authentication guide screen illustrated in FIG. 6 on the display device 3 until an infrared image taken by the infrared camera 7 is displayed in S180 (described later).

In S30, the control unit 20 causes the infrared camera 7 to take the infrared image. The control unit 20 stores the data of the infrared image output from the infrared camera 7, for example, in a predetermined area of the memory 104. If the data of another infrared image has been stored in the predetermined area of the memory 104, the control unit 20 overwrites the data of the other infrared image with the data of the infrared image taken by the infrared camera 7 in S30. The data of the infrared image is preferably stored in a secure area of the memory 104 in which, for example, data is encrypted when the data is stored.

In S40, the control unit 20 detects a line of sight from the user's eyes in the data of the infrared image stored in the memory 104 in S30. Since an example in which the user of the smartphone 1 takes a photograph of his/her face to perform the iris authentication is herein described, the subject of an infrared image is the user in many cases.

To detect the user's line of sight from the data of an infrared image, a publicly known line-of-sight detection method disclosed, for example, in Japanese Laid-open Patent Publication No. 2005-253778 may be applied.

Specifically, the control unit 20 uses the center coordinates of a pupil of the user in a two-dimensional coordinate system. A point that is the focal length of the infrared camera 7 away from the center of the lens of the infrared camera 7 is defined as the center coordinates. The control unit 20 determines the coordinates of a center T of the pupil in a three-dimensional coordinate system indicating the real space. The control unit 20 also determines the coordinates of a center S of a spherical surface including a cornea of the user as a partial spherical surface based on the coordinates of a reflection point of the infrared ray on the cornea, that is, a bright point. The control unit 20 detects, as the user's line of sight, a line (hereinafter, referred to as a straight line-of-sight) connecting the center T of the pupil and the center S of the spherical surface defined on the eyeball. The focal length is a distance from the lens of the infrared camera 7 to an imaging device included in the infrared camera 7 at the time of focusing performed on the subject. Since Japanese Laid-open Patent Publication No. 2005-253778 is publicly known, further description is omitted.

The control unit 20 may detect the user's line of sight in the infrared image by using a different method from the line-of-sight detection method disclosed in Japanese Laid-open Patent Publication No. 2005-253778 described above.

In S50, the control unit 20 determines whether the line of sight from the user's eyes is detected in S40, that is, whether the straight line-of-sight from the eyes are detected. In the case of a negative judgment, the infrared image thus taken is assumed to not include the iris regions corresponding to the irises of the eyes to be used for the iris authentication, and the process thus returns to S30. The control unit 20 causes the infrared camera 7 to again take an infrared image in S30 and repeats the detection of the line of sight from the user's eyes. If the judgment step in S50 results in an affirmative judgment, the process moves to S60.

An example in which the iris authentication is performed using the iris regions of the eyes is herein described. However, the iris authentication may be performed using the iris region of one of the eyes. In this case, whether a line of sight from at least one of the user's eyes is detected in S50 may be determined. The use of the iris region of the eye for the iris authentication has a lower accuracy than the use of the iris regions of the eyes for the iris authentication but may reduce the time taken for the authentication.

In S60, the control unit 20 determines whether the direction of the straight line-of-sight detected in S40 coincides with the direction of an optical axis connecting the user's eyes and the infrared camera 7. Note that the case where the direction of the straight line-of-sight coincides with the direction of the optical axis refers to a case where a difference between the direction of the straight line-of-sight and the direction of the optical axis is within a predetermined range.

If the judgment in S60 results in a negative judgment, the user in the infrared image is not looking at the infrared camera 7. Accordingly, the taken image of the iris regions of the user is likely to be not clear enough for the iris authentication. Accordingly, the process returns to S30, and the control unit 20 causes the infrared camera 7 to again take an infrared image in S30 and repeats the detection of the user's line of sight. If the judgment in S60 results in an affirmative judgment, the process moves to S70.

In S70, the control unit 20 measures, for example, the sight distance from the user that is the subject based on the infrared image stored in the memory 104 in S30. To detect the sight distance from the user that is the subject based on the infrared image, a publicly known sight-distance detection method disclosed, for example, in Japanese Laid-open Patent Publication No. 2005-253778 may be applied.

Specifically, in addition to the two-dimensional coordinate system and the three-dimensional coordinate system that are defined for detecting the line of sight in S40, the control unit 20 defines a reference coordinate system for equalizing the size of pieces of data by converting the scale of each axis of the three-dimensional coordinate system. The control unit 20 calculates the sight distance by identifying the location of the eyes of the subject based on relational expressions for: projecting, on the reference coordinate system, the coordinates of each of the right eye, the left eye, and the nose in the two-dimensional coordinate system; projecting the aforementioned coordinates on the three-dimensional coordinate system; and representing a positional relationship among the right eye, the left eye, and the nose. Since Japanese Laid-open Patent Publication No. 2005-253778 is publicly known, further explanation is omitted.

In S80, the control unit 20 determines whether the sight distance measured in S70 is equal to or shorter than the predetermined reference distance.

The reference distance is in advance set to such a value that leads to a face occupancy proportion equal to or higher than the threshold when an image of the user's face is taken, for example, at the lowest photographing magnification, that is, the widest angle of view in the specifications of the infrared camera 7. Further, the threshold for the aforementioned face occupancy proportion is in advance set to a value that keeps the background region of the infrared image from including a person or the like other than the user. Alternatively, the threshold is in advance set to a value leading to the size of the person or the like other than the user that is too small to identify the person or the like even if the background region includes the person or the like. The person or the like means at least one of a person or an object. If the angle of view of the infrared image is variable, the control unit 20 may set the reference distance to an unfixed value. The control unit 20 may acquire the angle of view from the infrared camera 7 and change the reference distance to a value leading to the face occupancy proportion equal to or higher than the threshold based on the angle of view of the infrared camera 7.

The judgment in S80 corresponds to determining whether the face occupancy proportion in the taken infrared image is equal to or higher than the aforementioned threshold.

In addition, for example, when the user performs the iris authentication for unlocking the smartphone 1, the user himself/herself, in many cases, takes a photograph of his/her face with the smartphone 1 held with his/her hand as illustrated in FIG. 2. Accordingly, the maximum distance in which the user may take a photograph of his/her face with his/her hand extended is estimated at about 60 cm judging from, for example, an average length of an arm of an adult. Accordingly, the reference distance is often set to, for example, about 60 cm or shorter based on this.

In other words, if the sight distance measured in S70 is longer than the reference distance, it is conceivable that the smartphone 1 is not oriented toward the user. This means that the person in the infrared image is highly likely to be a person other than the user.

Accordingly, if the judgment in S80 results in a negative judgment, the process returns to S30. The control unit 20 causes the infrared camera 7 to again take an infrared image in S30 and repeats detecting the user's line of sight in S40 and measuring the sight distance in S70 until the judgment in S80 results in an affirmative judgment.

If the judgment in S80 results in an affirmative judgment, the process moves to S90. In this case, it is assumed that the infrared image taken by the infrared camera 7 in S30 includes the user's face in the face occupancy proportion equal to or higher than the threshold.

The steps from S10 to S80 are referred to as an "unlocking preparation process" for convenience of description.

Figure 7A:
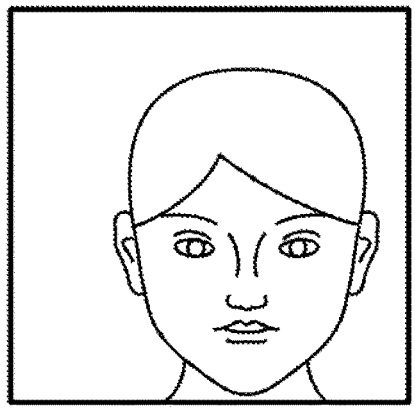
FIG. 7A is a diagram illustrating an example infrared image taken with a sight distance exceeding a reference distance.

In an infrared image illustrated in FIG. 7A, the line of sight from the user's eyes has been detected, and the user's line of sight is oriented toward the infrared camera 7. However, the sight distance exceeds the reference distance. The judgment performed on the infrared image illustrated in FIG. 7A in S80 thus results in a negative judgment, and an infrared image is taken again. As illustrated in FIG. 7A, in an infrared image taken with a sight distance exceeding the reference distance, a region including a person or the like other than the user is present around the user's face.

Figure 7B:
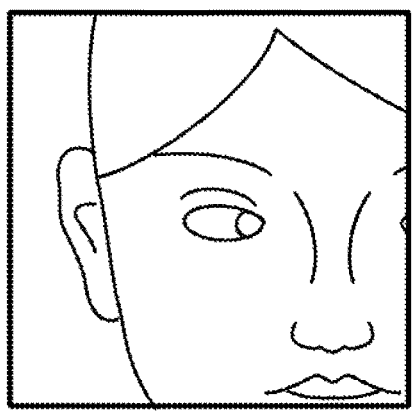
FIG. 7B is a diagram illustrating an example infrared image in which an eye is detected.

Since an infrared image illustrated in FIG. 7B does not include one of the user's eyes, the line of sight from the user's eyes is not detected. Accordingly, the judgment performed on the infrared image illustrated in FIG. 7B in S50 results in a negative judgment, and an infrared image is taken again. For example, even though the judgment in S50 is judgment in which an affirmative judgment results from detection of the line of sight from an eye, the user's line of sight in the infrared image illustrated in FIG. 7B is not oriented toward the infrared camera 7. Accordingly, the judgment performed on the infrared image illustrated in FIG. 7B in S60 results in a negative judgment, and an infrared image is taken again.

For example, consider a case where the criterion for the judgment in S50 is that detection of the line of sight from an eye results in an affirmative judgment. In this case, if the line of sight from one eye is detected, and if the line of sight from the eye is oriented toward the infrared camera 7, the judgment in S80 is performed.

In this case, however, the infrared image may have only approximately half of the user's face as illustrated in FIG. 7B. Even though the sight distance is equal to or shorter than the reference distance, the infrared image may not have the user's face that accounts for the face occupancy proportion equal to or higher than the threshold. Accordingly, if the reference distance is based on, for example, the judgment criterion for the judgment in S50 on which detection of the line of sight from one of the eyes results in an affirmative judgment, it is preferable that the reference distance be set to a value smaller than the reference distance used for the criterion on which detection of the line of sight from the eyes results in an affirmative judgment.

Figure 7C:
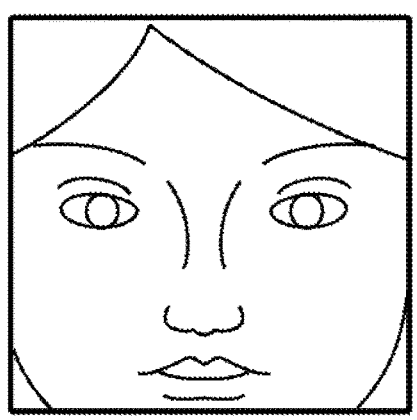
FIG. 7C is a diagram illustrating an example infrared image taken with the sight distance being equal to or shorter than the reference distance.

In the infrared image illustrated in FIG. 7C, the line of sight from the user's eyes is detected, and the user's line of sight is oriented toward the infrared camera 7. Further, the infrared image illustrated in FIG. 7C has been taken with the sight distance being equal to or shorter than the reference distance and thus represents a state where the face occupancy proportion of the user in the taken infrared image is higher than the threshold. Accordingly, the judgment performed on the infrared image illustrated in FIG. 7C in S80 results in an affirmative judgment, and the unlocking preparation process is terminated.

The infrared images in FIGS. 7A, 7B, and 7C are displayed on the display device 3 in S180 in FIG. 5 and are thus not displayed on the display device 3 until S180 is executed.

In S90, the control unit 20 causes the infrared camera 7 to take a new infrared image and stores the data of the infrared image output from the infrared camera 7, for example, in the predetermined area of the memory 104. In this case, the control unit 20 overwrites the data of the infrared image stored in the predetermined area of the memory 104 in S30 with the data of the infrared image taken by the infrared camera 7 in S90.

In S100, the control unit 20 performs the same processing as in S40 on the infrared image taken by the infrared camera 7 in S90 to detect the user's line of sight.

In S110, the control unit 20 determines whether the line of sight from the user's eyes has been successfully detected in S100, that is, whether the straight line-of-sight from the eyes has been successfully detected. In the case of a negative judgment, the process returns to S20, and the unlocking preparation process is executed again. In the case of an affirmative judgment, the process moves to S120.

In S120, the control unit 20 determines whether the direction of the straight line-of-sight detected in S110 coincides with the direction of the optical axis connecting the user's eyes and the infrared camera 7. In the case of a negative judgment, the process returns to S20, and the unlocking preparation process is executed again. In the case of an affirmative judgment, the process moves to S130.

In S130, the control unit 20 measures the sight distance from the user based on the infrared image stored in the memory 104 in S90 by using the method described with reference to S70.

In S140, the control unit 20 determines whether the sight distance measured in S130 is equal to or shorter than the predetermined reference distance. The judgment in S140 corresponds to determining whether the face occupancy proportion in the taken infrared image is equal to or higher than the threshold. In the case of a negative judgment, the process returns to S20, and the unlocking preparation process is executed again. In the case of an affirmative judgment, the process moves to S150.

In S150, the control unit 20 extracts the iris regions of the user from the infrared image taken in S90.

In S160, the control unit 20 compares the iris pattern representing the shapes and arrangement of the irises in the iris regions of the user extracted in S150 with the iris pattern of the iris image of the authorized user and performs the iris authentication in which the degree of matching of the iris patterns is obtained. The data of the iris image of the authorized user may be stored in advance, for example, in the predetermined area of the memory 104.

In S170, the control unit 20 determines whether the iris patterns match as the result of the comparison of the iris patterns in S160. Note that a case where the iris patterns match refers to a case where, for example, a value obtained by numerically expressing the degree of matching of the iris patterns is equal to or higher than a reference authentication value. The reference authentication value is set to a lower limit value for the degree of matching. If a value of the degree of matching is equal to or higher than the lower limit value, the iris patterns are regarded to match. The reference authentication value is a value set based on, for example, verification experiments, computer simulation, or the like performed for the iris authentication. The reference authentication value is in advance stored, for example, in the predetermined area of the memory 104.

If the iris patterns do not match, that is, if the authentication fails, the process moves to S180.

One of conceivable causes of the authentication failure is, for example, unclear iris regions of the user in the infrared image. Accordingly, the control unit 20 notifies the user of the location of the smartphone 1 that is suitable for taking an image of the iris regions for the iris authentication and thereafter executes the iris authentication again.

Accordingly, in S180, the control unit 20 controls the display unit 30 to display the infrared image taken in S90 on the display device 3. In other words, instead of the iris authentication guide screen illustrated in FIG. 6 that has been displayed on the display device 3 in S20, the infrared image of the user is displayed on the display device 3.

In S190, the control unit 20 controls the display unit 30 and superposes a frame on the infrared image displayed on the display device 3 in S180. The frame represents the location and the size of the eyes so as to take an image of iris regions of suitable size for the iris authentication. The control unit 20 repeats S90 to S190 and executes the iris authentication until the iris authentication succeeds in S170.

The steps from S90 to S190 are referred to as an "unlocking process" for convenience of description.

Figure 8A:
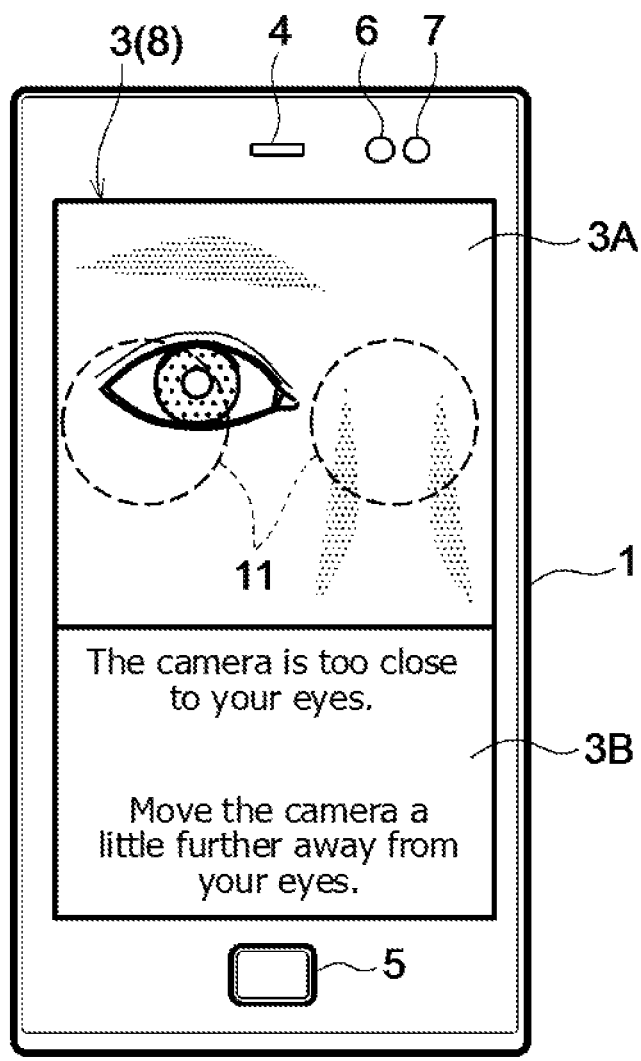
FIG. 8A is a diagram illustrating an example image displayed on a display device when the iris authentication fails.

After S190 is executed, for example, as illustrated in FIG. 8A, an image having a frame 11 superposed on the infrared image of the user is displayed on the display device 3. The user adjusts the location of the smartphone 1 relative to the users face to fit the location and the size of the eyes in the frame 11 while looking at the infrared image displayed on the display device 3. The user may thereby take an infrared image including the iris regions of suitable size for the iris authentication.

In this case, the control unit 20 divides the display region of the display device 3 into two regions 3A and 3B. The control unit 20 displays the infrared image, for example, in the region 3A and a message regarding the iris authentication in the region 3B.

Specifically, if the sight distance measured in S130 is equal to or shorter than, for example, one tenth of the reference distance, the control unit 20 displays, in the region 3B, a message notifying the user that the infrared camera 7 are too close to the eyes. In this case, the message may also be output using voice to obtain the suitable size of iris regions for the iris authentication.

In the mode described above, if the sight distance is equal to or shorter than one tenth of the reference distance, the message notifying the user that the infrared camera 7 is too close to the eyes is displayed. However, there is no limitation on the judgment criterion, that is, how much shorter the sight distance is to be than the reference distance when the message is displayed. A value other than one tenth may be set.

Figure 8B:
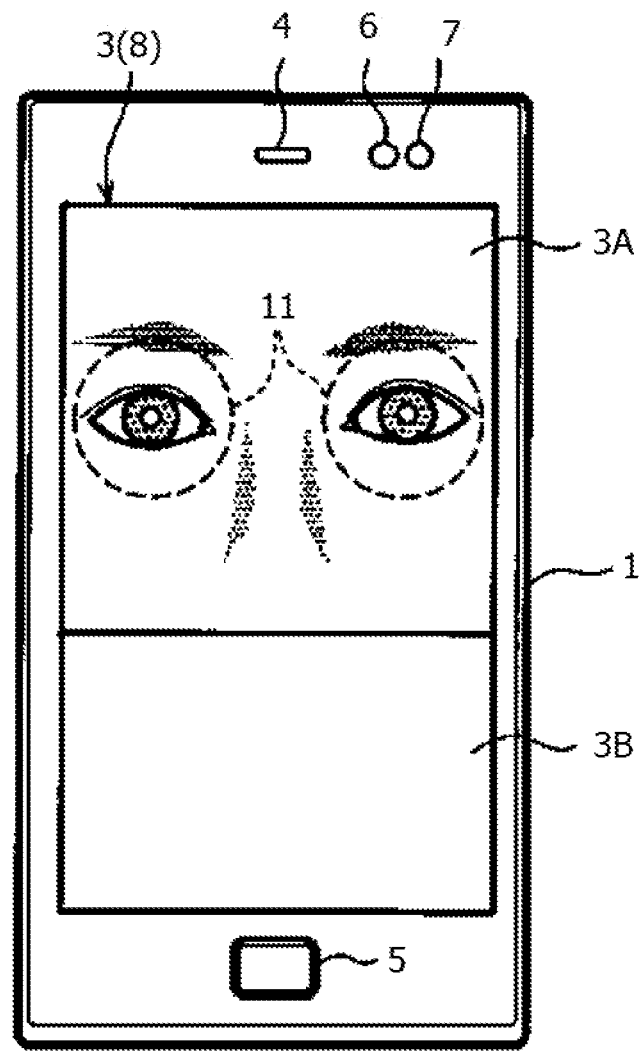
FIG. 8B is a diagram illustrating an example image displayed on the display device when the iris authentication succeeds.

FIGS. 8A and 8B illustrate the mode in which the display region of the display device 3 is divided into the regions 3A and 3B by using a division line parallel to a short side of the display region. However, the aforementioned division mode is an example, and the display region of the display device 3 may be divided by using, for example, a division line parallel to a long side of the display region.

In addition, if the judgment performed in any one of S110, S120, and S140 on the infrared image again taken by the infrared camera 7 in S90 results in a negative judgment, the process returns to S20 as described above. In S20, the iris authentication guide screen illustrated in FIG. 6 is displayed on the display device 3. Accordingly, if the judgment performed in any one of S110, S120, and S140 results in a negative judgment, the infrared image of the user thus taken and the frame 11 are not displayed. In other words, if the process returns from the unlocking process to the unlocking preparation process, the infrared image of the user thus taken is not displayed on the display device 3.

If the judgment in S170 results in an affirmative judgment, that is, if the iris patterns of the user and the authorized user match, and if the iris authentication succeeds, the process moves to S200.

In S200, the control unit 20 turns off the infrared LED 6 turned on in S10. In this case, the control unit 20 may erase the data of the infrared image stored in the predetermined area of the memory 104 in S90.

In S210, the control unit 20 unlocks the smartphone 1 and subsequently executes a process corresponding to instruction manipulation received by the receiving unit 10. The process corresponding to the instruction manipulation is an example of a predetermined process in the disclosed technology.

If the iris authentication succeeds in S170, a face image of the user with the eyes accommodated in the frame 11 is displayed in the region 3A of the display device 3, for example, as illustrated in FIG. 8B. A message notifying the user of the success of the iris authentication is displayed in the region 3B.

If the authentication succeeds in a first round of the judgment in S170, the control unit 20 unlocks the smartphone 1 without displaying the infrared image including the user on the display device 3. However, the process performed if the iris authentication succeeds in a first round is not limited to such a process. For example, the control unit 20 may display, on the display device 3, a screen illustrated in FIG. 8B before executing S200 and notify the user of the success of the authentication. In this case, the control unit 20 may notify the user of the success of the authentication by using a sound or vibrations of a vibrator incorporated in the smartphone 1.

With the smartphone 1 according to the first embodiment as described above, the iris authentication is executed if the face occupancy proportion in the taken infrared image is equal to or higher than the threshold. If the iris authentication fails, the taken infrared image is displayed on the display device 3 of the smartphone 1.

Accordingly, if photographing with the infrared camera 7 is started to unlock the smartphone 1 when a person is present around the user, for example, in the train, an image displayed on the display device 3 is an infrared image having the face occupancy proportion equal to or higher than the threshold. Moreover, in the infrared image displayed on the display device 3, the area of the region as the background of the user as illustrated in FIG. 7C is smaller than that in FIG. 7A. Accordingly, the possibility that an unintended person or the like is present in the background region of the infrared image may be reduced. The smartphone 1 that controls displaying an image on the display device 3 is an example of a display control device in the disclosed technology.

Further, unless a distance between the infrared camera 7 and the subject is within the reference distance, the face image of the subject is not displayed on the display device 3. As described above, if the reference distance is set equal to or shorter than, for example, 60 cm, it is desirable that the smartphone 1 be located within 60 cm from the face of the person to take an image of the face of another person. Accordingly, in this case, an image of the face of another person is actually hindered from being taken without permission of the person.

The smartphone 1 may thus reduce misunderstandings where performing the iris authentication is misunderstood by another person as harassment such as sneak photography.

Even if the infrared camera 7 of the smartphone 1 is used for an attempt to take a see-through image of a person wearing clothes utilizing transmission of an infrared ray, only an image of the user's face having the face occupancy proportion equal to or higher than the threshold is displayed on the display device 3. Accordingly, the smartphone 1 may hinder the infrared camera 7 from being used for such illicit purposes.

The smartphone 1 according to the first embodiment takes an infrared image at least two times until the iris authentication is executed. The smartphone 1 thereafter determines, for each infrared image thus taken, whether (hereinafter, referred to as iris authentication availability judgment) the user's line of sight is oriented toward the infrared camera 7 and whether the sight distance is equal to or shorter than the reference distance. If the iris authentication availability judgment performed on every taken infrared image results in an affirmative judgment, the smartphone 1 executes the iris authentication. In other words, the smartphone 1 performs the iris authentication availability judgment for each of the plurality of the infrared images taken in a time series and may thereby judge whether the state where the infrared camera 7 is oriented toward the user's face continues.

It is preferable that an image of the iris regions clear enough to perform the iris authentication be taken, for example, with the smartphone 1 being oriented toward the user's face for a predetermined period of time or longer and with the posture of the smartphone 1 being stable.

Accordingly, the smartphone 1 executes the iris authentication availability judgment a plurality of times and may thereby take a clear infrared image with less camera shake or the like than in a case where the iris authentication availability judgment is performed only once. Accordingly, the number of times the iris authentication fails may be reduced.

Further, if the iris authentication fails in S170, the smartphone 1 according to the first embodiment displays the infrared image of the face of the user, the frame 11, and the like on the display device 3. Accordingly, the smartphone 1 takes an image of the user's eyes in the location and the size suitable for the iris authentication more easily than in a case where the infrared image taken by the infrared camera 7 is not displayed on the display device 3 during the iris authentication. In other words, this enhances convenience in taking an image of the iris regions corresponding to the irises of the user in a location or a size suitable for the iris authentication.

In the iris authentication process illustrated in FIG. 5 in S60 and S120, whether the line of sight from the subject is oriented toward the infrared camera 7. However, S60 and S120 are not related to the judgment of the face occupancy proportion in the infrared image and thus may be omitted.

Second Embodiment

Subsequently, only a difference in a second embodiment of the disclosed technology from the first embodiment will be described.

In the first embodiment, the example in which the iris authentication is performed in the following manner has been described. Specifically, whether the face occupancy proportion in the taken infrared image is equal to or higher than the threshold is determined based on whether the sight distance is longer or shorter than the reference distance based on the angle of view. If the sight distance is equal to or shorter than the reference distance, that is, if the face occupancy proportion is equal to or higher than the threshold, the iris authentication is performed.

In the second embodiment, a mode of performing the iris authentication will be described. In the mode, the number of pixels in the taken infrared image is compared with the number of pixels in the face image of the user in the infrared image, and whether the face occupancy proportion is equal to or higher than a threshold is determined.

As illustrated in FIG. 3, the same configuration as the configuration of the smartphone 1 described in the first embodiment may be used for a smartphone 1A according to the second embodiment.

The control unit 20 according to the second embodiment compares the number of pixels in the taken infrared image with the number of pixels in the face image of the user in the infrared image in the unlocking preparation process. If the face occupancy proportion is equal to or higher than the threshold, the process moves to the unlocking process.

Subsequently, operations of the smartphone 1A according to the second embodiment will be described. When being notified of receiving of the pressing of the unlock button 5 from the receiving unit 10, the control unit 20 executes an iris authentication process in FIG. 9 for determining whether the feature of the image of the iris regions taken by the infrared camera 7 is similar to the feature of the iris regions of the authorized user of the smartphone 1A.

Figure 9:
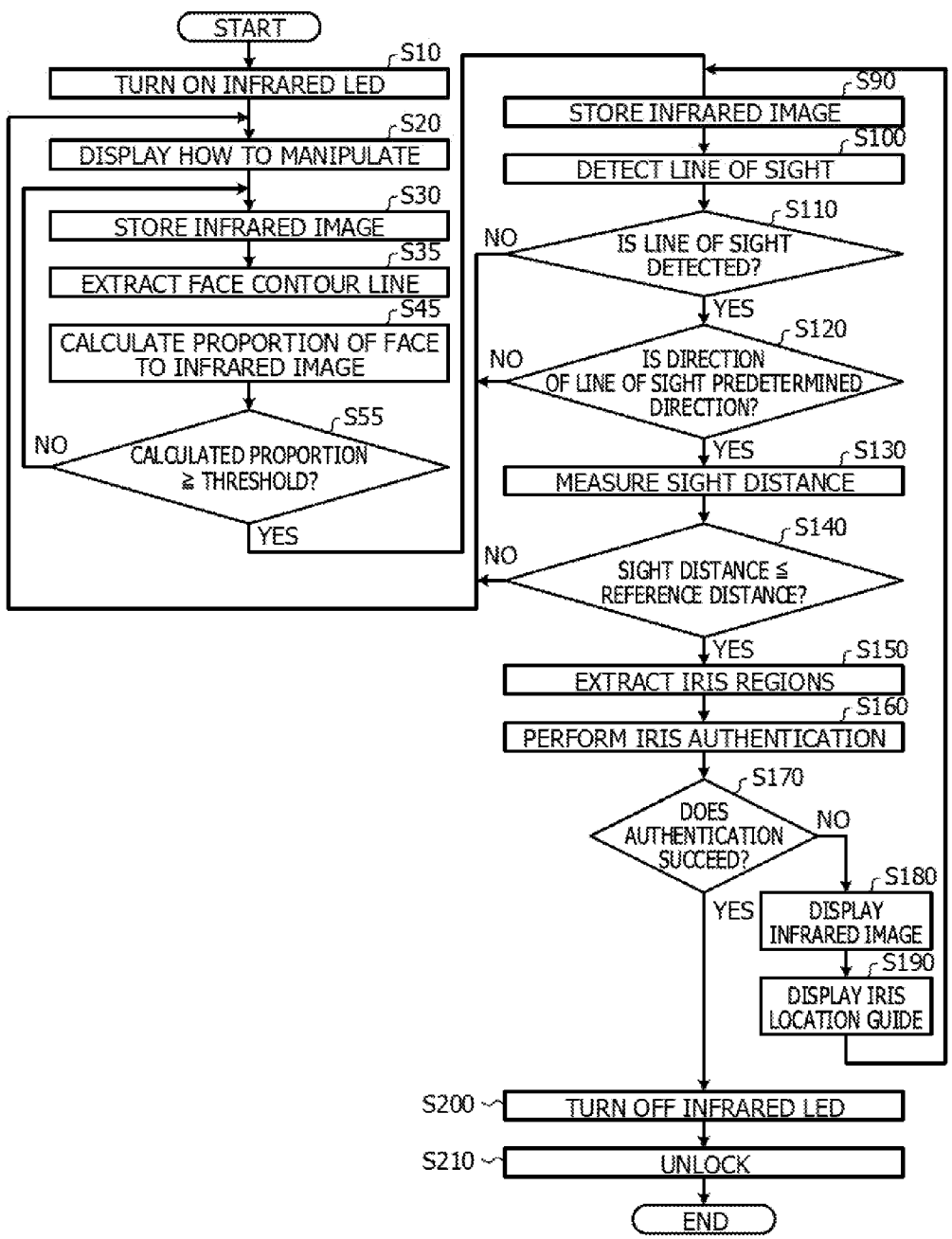
FIG. 9 is a flowchart illustrating an example of an iris authentication process according to the second embodiment.

The iris authentication process illustrated in FIG. 9 is different from the iris authentication process described in the first embodiment (see FIG. 5) in that S35 to S55 are performed instead of S40 to S80.

In S35, the control unit 20 recognizes the user's face in the infrared image taken by the infrared camera 7 in S30 and extracts a face contour line. Publicly known methods are usable as a method for recognizing a face in an infrared image and a method for extracting a face contour line.

Examples of the usable face recognition method include a method in which a geometric feature obtained based on the shape and arrangement of parts of a face such as the eyes and the nose is utilized and a method in which pattern recognition is performed in such a manner that the order of feature vectors obtained from an infrared image is compressed by main component analysis or the like. Examples of the usable face-contour-line extraction method include a method in which a differential filter such as the Laplacian filter is used and template matching represented by the Prewitt method in which an image is compared with a standard contour pattern prepared in advance.

In S45, the control unit 20 measures the number of pixels in the entire infrared image taken by the infrared camera 7 in S30 (hereinafter, referred to as the total number of pixels). The control unit 20 measures the number of pixels (hereinafter, referred to as the number of pixels in face) in the image within the face contour line extracted from the infrared image in S35, that is, the face image. The control unit 20 calculates the proportion of the number of pixels in face to the total number of pixels and thereby obtains the face occupancy proportion.

In S55, the control unit 20 determines whether the face occupancy proportion calculated in S45 is equal to or higher than the threshold. As described in the first embodiment, the threshold for the aforementioned face occupancy proportion is in advance set to a value that keeps the background region of the infrared image from including a person or the like other than the user. Alternatively, the threshold is in advance set to a value leading to the size of the person or the like other than the user that is too small to identify the person or the like even if the background region includes the person or the like.

If the judgment in S55 results in a negative judgment, the process returns to S30. The control unit 20 causes the infrared camera 7 to again take an infrared image in S30. The control unit 20 repeats S30 to S55 until the face occupancy proportion becomes equal to or higher than the threshold.

In other words, the control unit 20 does not execute the unlocking process after S90 while it is conceivable that the infrared image taken by the infrared camera 7 in S30 is highly likely to include the person other than the user.

Figure 10C:
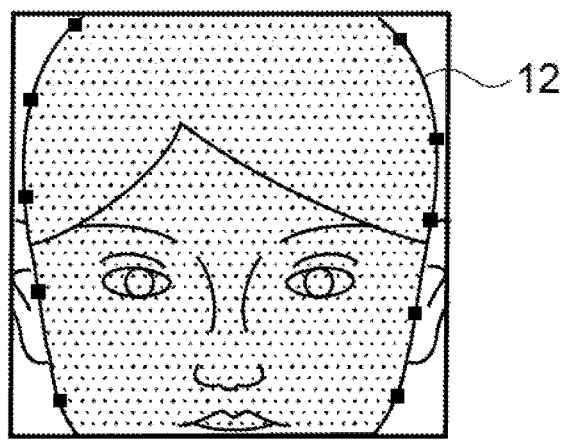
FIG. 10C is a diagram illustrating an example infrared image in which the face occupancy proportion is equal to or higher than the threshold.

FIG. 10A illustrates an example of an infrared image in which the proportion of the number of pixels in face to the total number of pixels is lower than the threshold. A contour 12 illustrated in FIGS. 10A to 10C corresponds to the outer edge of the face image. The infrared image illustrated in FIG. 10A is likely to include an unintended person or the like in the region as the background of the face image. Accordingly, the judgment in S55 results in a negative judgment, and an infrared image is taken again.

The infrared image illustrated in FIG. 10B has a shorter sight distance than the infrared image illustrated in FIG. 10A. However, part of the user's face is outside the photographing range of the infrared camera 7, and the proportion of the number of pixels in face to the total number of pixels is thus lower than the threshold. Also in this case, an unintended person or the like is likely to be included in the region as the background of the face image. Accordingly, the judgment performed on the infrared image illustrated in FIG. 10B in S55 results in a negative judgment, and an infrared image is taken again.

In contrast, the infrared image in FIG. 10C illustrates a state where the proportion of the number of pixels in face to the total number of pixels is equal to or higher than the threshold. In this case, the infrared image has a smaller area of the background region that is likely to include an unintended person or the like than the infrared images illustrated in FIGS. 10A and 10B. Accordingly, even if the person or the like other than the user is included in the background region, it is difficult to identify the person or the like. Accordingly, the judgment performed on the infrared image illustrated in FIG. 10C in S55 results in an affirmative judgment, and the unlocking process is executed.

The infrared images illustrated in FIGS. 10A to 10C illustrate an example of the face image excluding the ears. However, the ears may be regarded as parts of the face, and a face image including the ears may be extracted.

In the unlocking process from S90 to S190, the control unit 20 causes the infrared camera 7 to again take an infrared image in S90 in the same manner as in the iris authentication process described in the first embodiment. The control unit 20 performs the user's line of sight detection and the sight distance measurement and thereafter executes the iris authentication.

As described above, the smartphone 1A according to the second embodiment extracts the face image from the infrared image and calculates the face occupancy proportion based on the proportion of the number of pixels in face to the total number of pixels in the infrared image. If the face occupancy proportion is equal to or higher than the threshold, the smartphone 1A executes the unlocking process. If the iris authentication succeeds, the smartphone 1A is unlocked.

That is, the smartphone 1A measures the number of pixels in the infrared image and calculates the face occupancy proportion. Accordingly, the face occupancy proportion may be calculated more accurately than in the case where whether the face occupancy proportion is equal to or higher than the threshold is determined based on the sight distance and the angle of view.

In the second embodiment, the example has been described in which the proportion of the number of pixels in face to the total number of pixels in the taken infrared image is compared as the face occupancy proportion with the threshold in the unlocking preparation process that is a process prior to S90.

However, the same process as the unlocking preparation process according to the first embodiment illustrated in FIG. 5 may be executed in the unlocking preparation process according to the second embodiment, and the unlocking process according to the second embodiment from S100 to S140 may be replaced with S35 to S55 in FIG. 9. In other words, the proportion of the number of pixels in face to the total number of pixels in the taken infrared image may be compared as the face occupancy proportion with the threshold in the unlocking process. If the face occupancy proportion is equal to or higher than the threshold, the iris authentication may be performed. In this case, if the face occupancy proportion is lower than the threshold, the process returns to S20.

Third Embodiment

Subsequently, only a difference in a third embodiment of the disclosed technology from the first embodiment will be described.

In the third embodiment, description is given of a mode for reducing the possibility that an image of the user of the smartphone that is taken using the smartphone (hereinafter, a self-portrait) includes a person or the like other than the user.

Figure 11:
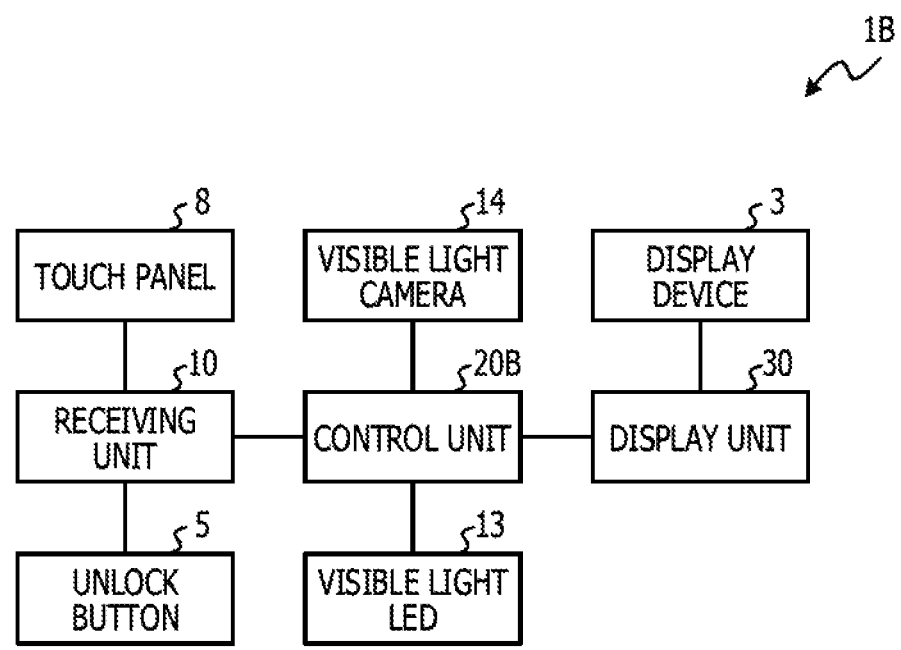
FIG. 11 is a diagram illustrating an example configuration of a smartphone according to a third embodiment.

As illustrated in FIG. 11, a smartphone 1B according to the third embodiment includes the display device 3, the unlock button 5, the touch panel 8, the receiving unit 10, a visible light LED 13, a visible light camera 14, a control unit 20B, and the display unit 30. The visible light herein refers to an electromagnetic wave that is equal to or higher than, for example, about 380 nm and lower than about 780 nm.

The visible light LED 13 is a light source that emits visible light. The visible light LED 13 starts or stops the emission of the visible light in accordance with an instruction based on manipulation of, for example, the touch panel 8.

The visible light camera 14 takes an image of the subject in such a manner that the visible light reflected on the subject is divided and detected by a plurality of photoelectric conversion elements for a plurality of pixels.

In an example, the visible light LED 13 and the visible light camera 14 are provided on the display surface side of the display device 3 as in the infrared LED 6 and the infrared camera 7 illustrated in FIG. 1. That is, the description is given on the assumption that the visible light camera 14 according to the third embodiment is used as the in-camera.

The control unit 20B is coupled to the receiving unit 10, the display unit 30, the visible light LED 13, and the visible light camera 14. When being notified of receiving of an instruction for starting taking an image from the receiving unit 10, the control unit 20B turns on, for example, the visible light LED 13 and causes the visible light camera 14 to take an image. The control unit 20B may cause the visible light camera 14 to take an image without turning on the visible light LED 13.

Figure 12:
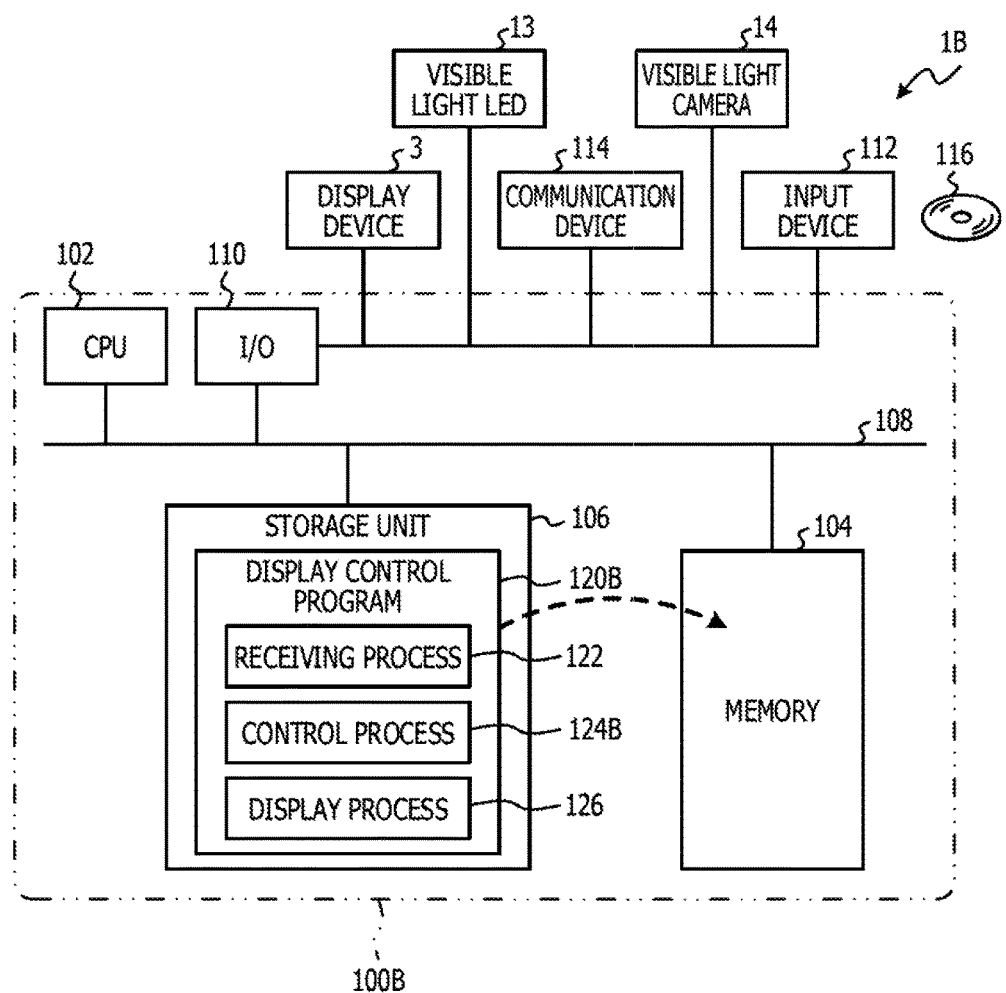
FIG. 12 is a diagram illustrating an example configuration employed when the smartphone according to the third embodiment is implemented by a computer.

The smartphone 1B may be implemented by a computer 100B illustrated in FIG. 12. The configuration illustrated in FIG. 12 is different from the configuration illustrated in FIG. 4 in that the visible light LED 13 and the visible light camera 14 are provided instead of the infrared LED 6 and the infrared camera 7, respectively. The storage unit 106 of the computer 100B stores therein a display control program 120B instead of the display control program 120. The display control program 120B includes a control process 124B instead of the control process 124 in FIG. 4.

The CPU 102 reads the display control program 120B from the storage unit 106, loads the display control program 120B into the memory 104, executes the processes included in the display control program 120B, and thereby causes the computer 100B to serve as the smartphone 1B illustrated in FIG. 11.

Specifically, the CPU 102 executes the control process 124B, and the computer 100B thereby serves as the control unit 20B illustrated in FIG. 11.

The computer 100B may also be implemented by, for example, a semiconductor integrated circuit, more specifically, an ASIC or the like.

Subsequently, operations of the smartphone 1B according to the third embodiment will be described. When being notified, from the receiving unit 10, of the start of a photographing mode (hereinafter, referred to as a selfie mode) in which the user of the smartphone 16 takes an image of the user himself/herself as a subject by manipulating the touch panel 8 or the like, the control unit 20B executes a selfie process.

Figure 13:
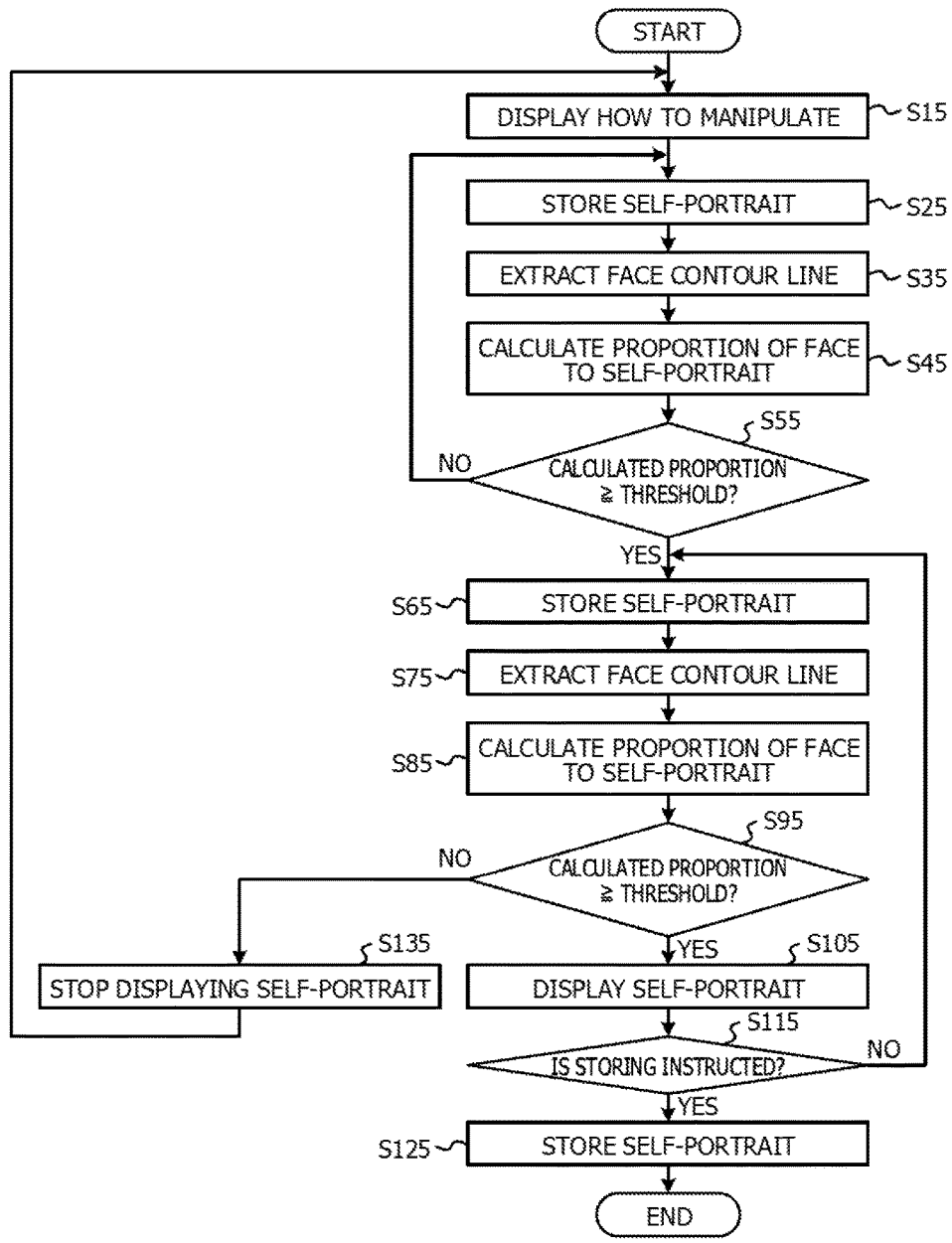
FIG. 13 is a flowchart illustrating an example selfie process according to the third embodiment.

In S15 in the selfie process illustrated in FIG. 13, the control unit 20B controls the display unit 30 and displays, on the display device 3, a screen (hereinafter, referred to as a selfie guide screen) notifying the user of the smartphone 1B that the smartphone 1B has entered the selfie mode.

Figure 14:
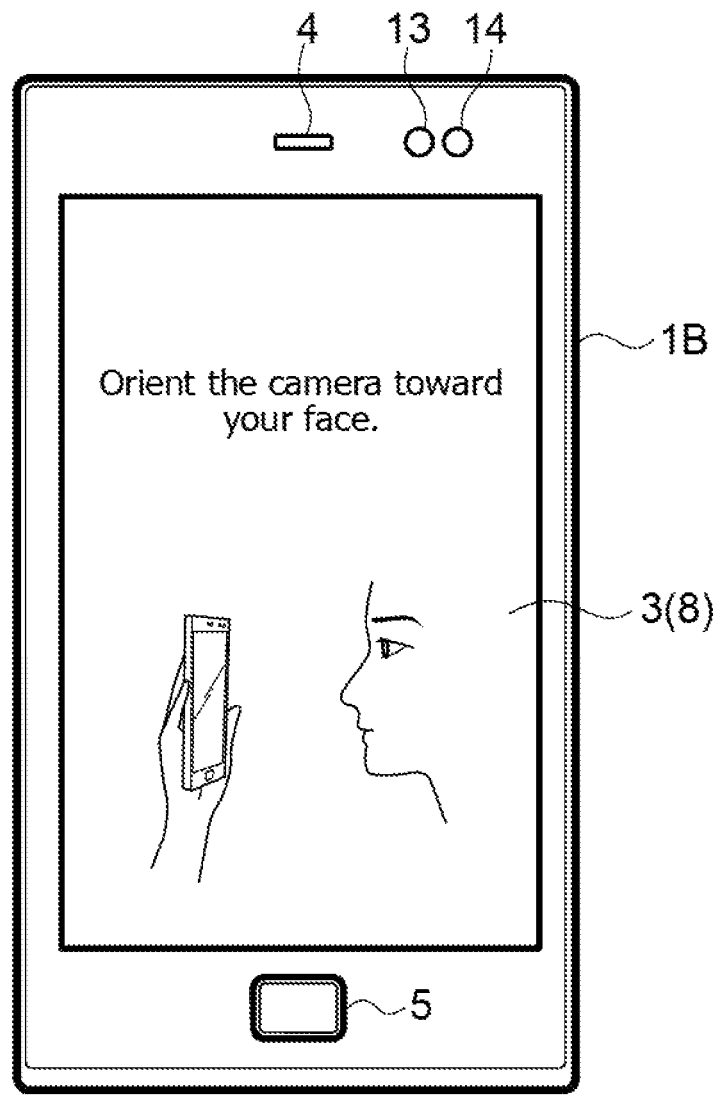
FIG. 14 is a diagram illustrating an example selfie guide screen.

In an example as illustrated in FIG. 14, a message instructing the user to orient the visible light camera 14 of the smartphone 1B toward the user such as "Orient the in-camera toward your face." is displayed on the selfie guide screen. In this case, the control unit 20B may display, on the display device 3 together with the message, an image depicting a state where the visible light camera 14 is oriented toward the user of the smartphone 1B. Displaying the image on the display device 3 enables the user to be notified of selfie manipulation in a more user-friendly manner than using only the message to notify the user of selfie manipulation. A sound may be used to notify the user that the smartphone 1B has entered the selfie mode.

In S25, the control unit 20B causes the visible light camera 14 to take an image and stores the data of the taken image, for example, in the predetermined area of the memory 104. If the data of another image has been stored in the predetermined area of the memory 104, the control unit 20B overwrites the data of the other image with the data of the image taken by the visible light camera 14 in S25.

In S35 and S45, the control unit 20B performs the same steps as those described in the second embodiment. The control unit 20B extracts a face image from the image taken by the visible light camera 14 in S25 and calculates the face occupancy proportion based on the proportion of the number of pixels in face to the total number of pixels.

In S55, the control unit 20B determines whether the face occupancy proportion calculated in S45 is equal to or higher than the threshold. In the case of a negative judgment, the process returns to S25, and S25 to S55 are repeated until an image having the face occupancy proportion equal to or higher than the threshold is taken.

If the judgment in S55 results in an affirmative judgment, the process moves to S65.

In S65, the control unit 20B causes the visible light camera 14 to take a new image and stores the data of the taken image, for example, in the predetermined area of the memory 104. In this case, the control unit 20B overwrites the data of the image stored in the predetermined area of the memory 104 in S25 with the data of the image taken by the visible light camera 14 in S65.

In S75 to S95, the control unit 20B again executes the same steps as S35 to S55 on the image taken by the visible light camera 14 in S65. The steps from S75 to S95 enable judgment of whether the user is still orienting the visible light camera 14 of the smartphone 1B toward the user with the face occupancy proportion in the image being still equal to or higher than the threshold. Here, if the judgment in S95 results in an affirmative judgment, that is, if the user is still orienting the smartphone 1B toward the user, and if the face occupancy proportion in the image is equal to or higher than the threshold, the process moves to S105.

In S105, the control unit 203 controls the display unit 30 and displays the image taken by the visible light camera 14 on the display device 3. In other words, instead of the selfie guide screen illustrated in FIG. 14 that has been displayed on the display device 3 in S15, the self-portrait having the face occupancy proportion equal to or higher than the threshold is displayed on the display device 3.

After making sure that the self-portrait is displayed on the display device 3, the user instructs the smartphone 1B to store the data of the self-portrait. Examples of a usable data-storing-instruction method include pressing the touch panel 8 and a gesture or the like that instructs the smartphone 1B to store the data. For the gesture or the like, movement of a hand, the eyes, or the like is in advance associated with the data storing instruction.

In S115, the control unit 20B determines whether the data storing instruction is received from the receiving unit 10. In the case of an affirmative judgment, the process moves to S125. In S125, the control unit 20B stores the data of the self-portrait for which the storing instruction has been issued, for example, in the predetermined area of the memory 104 and terminates the selfie process illustrated in FIG. 13. The storage place of the data of the self-portrait is not limited to the memory 104. For example, the data may be stored in a data server through the Internet by using the communication device 114.

If the judgment in S115 results in a negative judgment, the process returns to S65, and the face occupancy proportion in an image newly taken by the visible light camera 14 is calculated. If the face occupancy proportion is equal to or higher than the threshold, S65 to S115 in which displaying the image on the display device 3 are repeated.

If the judgment in S95 results in a negative judgment, that is, if the face occupancy proportion in the image becomes lower than the threshold due to the movement of the smartphone 1B or the user's face, the process moves to S135.

If the self-portrait has been displayed on the display device 3, the control unit 20B stops displaying the self-portrait in S135, and the process returns to S15. The control unit 20B repeats the steps after S15.

As described above, the smartphone 1B according to the third embodiment takes an image N times (N=2). If the face occupancy proportion of each image taken in a time series is equal to or higher than the threshold, the image is displayed on the display device 3. If the face occupancy proportion in the taken image becomes lower than the threshold when the image is displayed on the display device 3, the smartphone 1B stops displaying the image.

This may thus reduce the possibility that a person or the like other than the user who is performing the selfie is unintentionally included in the region as the background of the image of the user, that is, the self-portrait. The number of times an image is taken, that is, the number of times N whether the face occupancy proportion in the image is equal to or higher than the threshold is determined is not limited to 2 and may be equal to or lower than 3.

With reference to S160 in the iris authentication process (FIG. 5) described in the first embodiment and the iris authentication process (FIG. 9) described in the second embodiment, the mode in which the data of the iris image of the authorized user is in advance stored in the memory 104 has been described. However, the storage place for the data of the iris image of the authorized user is not limited thereto. For example, the data of the iris image of the authorized user may be stored in a data server through the Internet. When the iris authentication is performed, the data of the iris image of the authorized user may be downloaded from the data server to compare the data with the iris pattern of the user.

In the first and second embodiments, the sight distance may be measured by directly measuring a distance from the infrared camera 7 to the user's eyes by using a distance sensor. In this case, the distance sensor is preferably incorporated in each of the smartphones 1 and 1A.

The mode in which whether the proportion of a face image to a taken image is equal to or higher than the threshold is determined has heretofore been described. However, the disclosed technology is not limited thereto. For example, if the taken image is partially displayed on the display device 3 using a function of trimming, digital zoom, or the like, it is determined whether the proportion of the face image to the partially displayed region of the taken image displayed on the display device 3 is equal to or higher than the threshold. If the proportion is equal to or higher than the threshold, the taken image may be displayed.

The mode in which the display control programs 120 and 120B are in advance stored (installed) in the storage unit 106 has been described in the embodiments, but a mode of providing a display control program is not limited thereto. The display control program according to the disclosed technology may be provided in such a manner as to be recorded in the computer-readable recording medium 116. For example, the display control program according to the disclosed technology may be provided in such a manner as to be recorded in a portable recording medium such as a compact-disc read-only memory (CD-ROM), a digital versatile disk (DVD)-ROM, a Universal Serial Bus (USB) memory, or the like. The display control program according to the disclosed technology may be provided in such a manner as to be recorded in a semiconductor memory or the like such as a flash memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A display control method executed by a processor included in a terminal device that includes a display and a camera disposed at a display surface side of the display, the display control method comprising:
    acquiring a first image taken by the camera, the first image including a second image of a face;
    calculating a proportion of a region of the second image to a region of the first image;
    determining whether the proportion is equal to or higher than a threshold;
    displaying the first image on the display when it is determined that the proportion is equal to or higher than the threshold; and
    restraining the first image from being displayed on the display when it is determined that the proportion is not equal to or higher than the threshold,
    wherein
    the acquiring includes acquiring a plurality of the first images by taking the first images of a subject a plurality of times,
    the displaying includes displaying one of the taken first images on the display surface when each of a plurality of the proportions of a corresponding one of a plurality of the second images is equal to or higher than the threshold, the proportions being respectively calculated for the plurality of acquired first images, and
    the restraining includes restraining the display from displaying the taken first image on the display surface while at least one of the proportions of the respective second images is lower than the threshold, the proportions being respectively calculated for the plurality of acquired first images.

2. The display control method according to claim 1, wherein the region of the first image is a region that is displayed at the display surface of the display and that is included in an image taken by the camera.

3. The display control method according to claim 1, wherein the region of the first image is an entire region of an image taken by the camera.

4. The display control method according to claim 1, further comprising
    measuring a distance from the camera to an eye corresponding to the second image,
    wherein the calculating includes calculating the proportion by using the measured distance and an angle of view of the camera used when the first image is taken.

5. The display control method according to claim 1, wherein the calculating includes calculating the proportion by calculating a proportion of the number of pixels in the second image to the number of pixels of the first image.

6. The display control method according to claim 1, further comprising
    executing iris authentication in which, when it is determined that the proportion is equal to or higher than the threshold, an iris region included in the second image is compared with an iris image registered in advance.

7. The display control method according to claim 6, further comprising
    executing the iris authentication again based on an image newly taken, when an iris pattern of the iris region included in the second image is different from an iris pattern of the iris image registered in advance, as a result of the iris authentication.

8. A terminal device, comprising:
    a display;
    a camera disposed at a display surface side of the display; and
    a processor that controls the display and the camera, the processor configured to:
    acquire a first image taken by the camera, the first image including a second image of a face,
    calculate a proportion of a region of the second image to a region of the first image,
    determine whether the proportion is equal to or higher than a threshold,
    display the first image on the display when it is determined that the proportion is equal to or higher than the threshold, and
    restrain the first image from being displayed on the display when it is determined that the proportion is not equal to or higher than the threshold,
    wherein the acquiring by the processor includes acquiring a plurality of the first images by taking the first images of a subject a plurality of times, the displaying by the processor includes displaying one of the taken first images on the display surface when each of a plurality of the proportions of a corresponding one of a plurality of the second images is equal to or higher than the threshold, the proportions being respectively calculated for the plurality of acquired first images, and the restraining by the processor includes restraining the display from displaying the taken first image on the display surface while at least one of the proportions of the respective second images is lower than the threshold, the proportions being respectively calculated for the plurality of acquired first images.

9. A non-transitory computer-readable storage medium storing a program that causes a processor included in a terminal device to execute a process, the terminal device including a display and a camera disposed at a display surface side of the display, the process comprising:

acquiring a first image taken by the camera, the first image including a second image of a face;

calculating a proportion of a region of the second image to a region of the first image;

determining whether the proportion is equal to or higher than a threshold;

displaying the first image on the display when it is determined that the proportion is equal to or higher than the threshold; and restraining the first image from being displayed on the display when it is determined that the proportion is not equal to or higher than the threshold, wherein the acquiring includes acquiring a plurality of the first images by taking the first images of a subject a plurality of times, the displaying includes displaying one of the taken first images on the display surface when each of a plurality of the proportions of a corresponding one of a plurality of the second images is equal to or higher than the threshold, the proportions being respectively calculated for the plurality of acquired first images, and the restraining includes restraining the display from displaying the taken first image on the display surface while at least one of the proportions of the respective second images is lower than the threshold, the proportions being respectively calculated for the plurality of acquired first images.

* * * * *